United States Patent
Nakanishi et al.

(12) 
(10) Patent No.: US 7,192,477 B2
(45) Date of Patent: Mar. 20, 2007

(54) PROCESS FOR PRODUCING PIGMENT NANOPARTICLE

(75) Inventors: Hachiro Nakanishi, Miyagi (JP); Koich Baba, Miyagi (JP); Hitoshi Kasai, Miyagi (JP); Hidetoshi Oikawa, Miyagi (JP); Shuji Oikawa, Miyagi (JP)

(73) Assignee: Japan Science and Technology Agency, Kawaguchi (JP)

( * ) Notice: Subject to any disclaimer, the term of this patent is extended or adjusted under 35 U.S.C. 154(b) by 117 days.

(21) Appl. No.: 10/525,228

(22) PCT Filed: Apr. 2, 2003

(86) PCT No.: PCT/JP03/04229

§ 371 (c)(1),
(2), (4) Date: Feb. 22, 2005

(87) PCT Pub. No.: WO2004/026967

PCT Pub. Date: Apr. 1, 2004

(65) Prior Publication Data

US 2006/0076298 A1    Apr. 13, 2006

(30) Foreign Application Priority Data

Aug. 30, 2002 (JP) .............................. 2002-252389

(51) Int. Cl.
*C09B 67/02*    (2006.01)
*C09B 67/10*    (2006.01)
*C09B 67/12*    (2006.01)
*C09B 67/20*    (2006.01)

(52) U.S. Cl. ................... 106/412; 106/493; 106/494; 106/495; 106/496; 106/497; 106/498; 106/499; 106/503; 106/504

(58) Field of Classification Search ............... 106/412, 106/493, 494, 495, 496, 497, 498, 499, 503, 106/504
See application file for complete search history.

(56) References Cited

U.S. PATENT DOCUMENTS

| 4,997,454 A | 3/1991 | Violante et al. |
| 2002/0040665 A1 | 4/2002 | Dietz et al. |

FOREIGN PATENT DOCUMENTS

| EP | 1195413 | 4/2002 |
| JP | 06-079168 | 3/1994 |
| JP | 11130974 | 5/1999 |
| JP | 2000-026774 | 1/2000 |
| JP | 2002-138229 | 5/2002 |

*Primary Examiner*—Anthony J. Green
(74) *Attorney, Agent, or Firm*—Hahn & Voight PLLC (57) ABSTRACT

The process for producing highly concentrated nanometer-size fine particles of an organic pigment, which comprises dissolving the organic pigment in an amide solvent, especially an organic solvent comprising at least 50 vol % 1-methyl-2-pyrrodinone, and pouring the resultant organic pigment solution with stirring into a poor solvent which is not compatible with the organic pigment. The pigment may be a quinacridone pigment, phthalocyanine pigment etc. Any atmospheric pressure to a sub-critical and/or supercritical state can be employed as the production conditions.

17 Claims, 5 Drawing Sheets

Crystal Size / nm

PROCESS FOR PRODUCING PIGMENT NANOPARTICLE

FIELD OF THE INVENTION

The present invention relates to a method for preparation of organic pigment fine particles with nanometer size, especially organic pigment fine crystal particles with nanometer size, comprising, preparing high concentrated solution of organic pigment by using organic solution composed of amide solvent, then pouring said solution into poor solvent flow to above mentioned organic pigment under stirring, and preparing high concentrated dispersion of nanometer size fine particles of said organic pigment.

The term of "under stirring" means the stirring or mixing speed of 2000±1500 rpm in the case of use of a rotary stirrer, or means the stirring condition such as turbulent condition in the case of sub-critical or supercritical state.

BACKGROUND OF THE INVENTION

Since organic pigments have abundant hue, and good properties for coloring performance and transparency, are extensively applied as a coloring agent in various fields such as printing ink, ink for ink-jet, color toner for electronic photograph, color filter, reflection type display, cosmetics, and plastics. Further, several kinds of organic pigments are being investigated as functional materials in technical fields, being different from the use as the coloring agent, e.g., photoelectronic property or EL property, and are used as a constitutive material by utilizing said properties. In the case to use pigment in above mentioned various applications, particle size of pigment, shape of pigment and crystal form of pigment are the important properties, which affects to dispersability, coloring ability, weather resistance, light resistance and heat resistance at processing (Document 1: Dyes and pigments 21(1993) 273–297). For example, in a liquid type product containing an organic pigment for printing ink or ink for ink-jet, it is very important factor to control particle size and crystal form of pigment and to arrange the particle size distribution, for the improvement of thixotopic ability, coloring ability and disperse stability in the preservation of pigment. Further, the control of particle size of pigment, crystal form, and uniformity of particle size of pigment are important factors which affect to electrostatic stability in the use of toner for electronic photograph pigment, coloring ability and dispersing stability in cosmetics, and light resistance and weather resistance. Furthermore, in the development of above mentioned functional materials, it is important to find particle size, crystal and uniformity of particles size, and characteristics as the functional materials such as photoelectronic property, EL property, and to optimize the related photoelectric conductive property as well as the development of pigment derivatives with suitable function.

It is ideal that a product having properties requested for the organic pigment can be obtained by improving a synthesis method of organic pigment, however, at the present time, the method for preparation of organic pigment is not achieved to the technical level to satisfy said ideal situation. In particular, since quinacridone pigments and phthalocyanine pigments are superior in stability and safety as a coloring agent, these pigments are expected to be used in the field of photoelectronic property and EL property, and a new method for preparation of organic pigment particles is investigated. However, in an organic pigment obtained by new method, it is necessary to purify the synthesized crude pigment to control the particle size so as to adjust the desired condition, and to adjust the crystal form to cause the required characteristics as the coloring agent and the functional materials through the solvent post-treatment process.

Since the purpose of these treatment processes for the crude pigment is coincident to the requirement as the pigment, these treatments are called as pigment formation treatments.

In the meanwhile, since these pigments are generally insoluble in normal solvent, the pigment formation treatment contains various processes such as grinding, crystallization from sulfuric acid solution, and washing of crystallized particles, therefore, are not sufficient from the view point of energy consumption and environmental suitability (or versatility). And from the view point of characteristics of product, these pigments are not so the ideal, that is to say, the particle size is enough small monodispersed.

The inventors of the present invention have continued a development and an investigation of the technique to prepare nanometer size particles of organic compound. And in said development, the inventors of the present invention have established a technique called as re-precipitation method (Document 2: JP6-79168 publication). Namely, solution of organic compound is prepared using relatively easy-handling organic solvent, said prepared solution is poured into solvent which is poor solvent for said organic compound and is compatible with the organic solvent used for the preparation of the solution, by vigorous stirring, and then nanometer size particles of the organic compound by reprecipitation are fabricated.

In [0008] of the document 2, there is a description that [On the other hand, acid pasting method characterized by dissolving organic compound which is insoluble in normal solvent such as phthalocyanine pigment in sulfuric acid, accompanied with reaction to some extent, then dispersing into water and obtaining fine particles by mixing is disclosed, for example, in "The Phthlocyanines II" p. 35–37, F. H. Moser et al (1983, issued by CRC Press). This is a specific method to obtain fine particles of pigment, and since a strong acid is used, kinds of applied material to be used are limited, and the purity is in general lowered.].

Further, the inventors of the present invention also proposed the method for preparation of sub micron fine crystals of quinacridone pigment from crude quinacridone pigment particles, using reprecipitation method from supercritical or sub-critical solution [Document 3, WO 02/092700 A1, 21.11.02 International Publication, JP Laid Open Publication 2002-580681, laid open on May 15, 2002 (JPA 2001-144706)].

In this document, there is a description that quinacridone pigments with nanometer size can be obtained, however, it is not complete as the industrial production method. As a competitor to supply said pigments, suppliers of India and China are starting to join in the market, therefore, the development of a technique aiming mass production of high quality product is becoming the necessitated condition to overcome the competition with the competitors.

As a technique which can replace with the technique using sulfuric acid, there is a Paper from Allide Chemical Co., Ltd., reporting that crude quinacridone is heated in 8 times volume of polyphosphoric acid (PAA) at 85° C. to 100° C. for 4 to 18 hours, poured into methanol of 20 times volume, boiled for 1 hour, after washing by water, bright red or purple pigment is obtained. Further, the Paper describes that when crude β type quinacridone is dissolved in PAA and regenerated by lower aliphatic alcohol, β type changes to γ type, however, if treated by modified alcohol, quinacridone can maintain β type. Furthermore, there is a Paper reporting that the important factors to affect the product are temperature to cause regeneration, purity of alcohol and adding speed of alcohol. [Document 4, Yosio Nagai, Hisao Nishi "Dye and Drug" Vol 13, p 81–107 (88–89), (1968)].

Still further, in 9–15 page of "Journal of the Imaging Society of Japan" Vol. 37, No. 4, there is a description the preparation of α type oxotitaniumphthalocyanine pigment (hereinafter, abbreviated term: Pc pigment) comprising, forming a charge generating layer in a photo-semiconductor by dispersing α type oxotitaniumphthalocyanine pigment into a binder resin, the particle size of the Pc pigment used is 0.1 μm or less, and by refluxing in acetonitrile for 20 hours or in chloroform for 10 hours to obtain Pc pigment with said particle size and desired crystal form (page 10).

However, above mentioned pigment formation treatments, which do not use sulfuric acid, are not sufficient from the view point of simplicity and productivity. Therefore, it is very important to develop a pigment formation treatment technique, which dissolve problems referring to environment and energy, and to obtain organic pigment having desired pigment particle size and crystal form.

The subject of the present invention is to provide a pigment formation treatment technique, which dissolves the problems of conventional technique, and is available from the view point of industrial production. The inventors of the present invention continued an eager investigation to dissolve said problems using various solvents, and found that the amide solvents heated at high temperature can dissolve organic pigments, which does not indicate solubility in the organic solvents, especially quinacridone pigment or phthalocyanine pigment at high concentration. And, found that high concentrated pigment dispersion can be prepared by pouring the obtained solution into poor solvent to the pigment, especially into sufficiently cooled poor solvent, by vigorous stirring. Thus, said subject can be dissolved.

Further, the inventors of the present invention have found accidentally that among amide solvents, 1-methyl-2-pyrrolidinone has a specific solvent property that indicates into layers of polycyclic aromatic compound such as coal, and dissolve it, and can dissolve organic pigment at high concentration by breaking strong intermolecular interaction caused between planar electron conjugated molecules. Said accidental discovery and re-precipitation method which investigated eagerly by the inventors of the present invention are combined, and said subject can be dissolved.

DISCLOSURE OF THE INVENTION

The present invention is (1) the method for preparation of high concentrated nanometer size fine particles of organic pigment comprising, after dissolving organic pigment in organic solvent composed of amide solvent, pouring the obtained pigment solvent into solution, which is compatible with said solvent and is poor solvent to the pigment, by vigorous stirring. Desirably, (2) the present invention is the method for preparation of high concentrated nanometer size fine particles of organic pigment of (1), wherein the organic pigment is azo pigment, phthalocyanine pigment, quinacridone pigment isoindolinone pigment, cyanine pigment, merocyanine pigment, fullerene pigment, polycyclic aromatic compound or polydiacetylene pigment, furthermore desirably, (3) the present invention is the method for preparation of high concentrated nanometer size fine particles of organic pigment of (2), wherein the organic pigment is phthalocyanine pigment or quinacridone pigment.

And desirably, (4) the present invention is the method for preparation of high concentrated nanometer size fine particles of organic pigment of (1) to (3), wherein the amide solvent is at least the one selected from the group consisting of 1-methyl-2-pyrrolidinoe, 1,3-dimetyl-2-imidazolidinone, 2-pyrrolidinone, ε-caprolactum, formamide, N-methylformamide, N,N-dimethylformamide, acetoamide, N-methylacetoamide, N, N-dimethylacetoamide, N-methylpropaneamide and hexamethylphospholictriamide, further desirably, (5) the present invention is the method for preparation of high concentrated nanometer size fine particles of organic pigment of (1) to (4), wherein employed poor solvent is water, alcohol solvents, ketone solvents, ether solvents, aromatic solvents, carbon disulfide, aliphatic solvents, nitrile solvents, sulfoxide solvents, halide solvents, ester solvents, ionic solution or mixed solution consisting of these two or more solvents, furthermore desirably, (6) the present invention is the method for preparation of the organic pigment of nanometer size fine particles of organic pigment of (2) to (3), using solvent consisting of at least the one selected from the group consisting of 1-methyl-2-pyrrolidinone, 2-pyrrolidinone, 1,3-dimetyl-2-imidazolidinone, or a mixed amide organic solvent containing said solvents more than 50 volume % as a solvent for the organic pigment, and using water and/or alcoholic solvent as a poor solvent.

Moreover, desirably, (7) the present invention is the method for preparation of nanometer size fine particles of (1)–(6) comprising, carrying out the preparation of solution by dissolving an organic pigment under the conditions of heating at around maximum boiling point under atmospheric pressure to supercritical state, then pouring the prepared high concentrated organic pigment solution of 0.5 mmol/L–100 mmol/L into a poor solvent of liquid state at the lowest temperature.

PREFERRED EMBODIMENT OF THE INVENTION

The present invention will be described in more detail.

A. A pigment which can apply the method for preparation of fine particle of pigment of the present invention is a pigment comprising, having sufficient solubility with an organic solvent consisting of amide solution, being compatibility with said amide solution such as water, alcohol solvents, ketone solvents, ether solvents, aromatic solvents, carbon disulfide, aliphatic solvents, nitrile solvents, sulfoxide solvents, halide solvents, ester solvents or ionic solution and being possible to exist a combination of solvents to be poor solvent for the pigment (definition: solubility is 1 μmol/L or less). Concerning quinacridone pigments, phthalocyanine, in particular, metal phthalocyanine pigments or diazo pigments which become possible to apply the method for preparation of fine particle of pigment by using mixed poor solvents such as water and alcohol solvents e.g. lower alcohol, which carbon number is 4 or less, or acetone, it is very advantageous, because nanometer size crystal particles of these pigments are very difficult to obtain by conventional methods.

As the desirable amide solvent, 1-methyl-2-pyrrolidinone, 2-pyrrolidinone or 1,3-dimetyl-2-imidazolidinone can be mentioned.

B. In the present invention, it is possible to add cationic, anionic or nonionic surfactants for the purpose to adjust the crystal form of fine particles and to control the formation of secondary particles. A reactive surfactants are also advantageous to the preparation of fine particles.

C. As the preparation condition of organic pigment solution, temperature of boiling point of the solvent or less in atmospheric pressure to sub-critical and/or super critical conditions can be adopted. Refluxing condition can be also adopted.

Highly concentrated solution of organic pigment is desirable from the view point to prepare high density pigment dispersion, however, concerning facilitation for solution preparation and productivity, desirable range of concentration is 0.5 mmol/L to 100 mmol/L. From the view point of equipment, the temperature condition of boiling point of the solvent in atmospheric pressure is profitable.

D. Condition of poor solvent is the injection speed which adjust the depositing condition of pigment, and is possibly lower temperature condition than said organic pigment solution, and can select the range from atmospheric pressure to sub-critical, super critical condition.

Incidentally, the injection speed of the solution poured (10 μL–400 mL) is 10 μL/sec to 10 mL/sec for 1 mL to 50 L of poor solvent. In the case to stir the poor solvent, the stirring is carried out under turbulent condition, aiming to depress the formation of secondary particles, specifically a rotary stirrer is used at 2000±1500 rpm condition.

EXAMPLES

The present invention will be described more in detail by Examples. However, these examples intend to indicate the usefulness of the present invention, and not to limit the scope of the present invention.

Example 1

Figure 1:
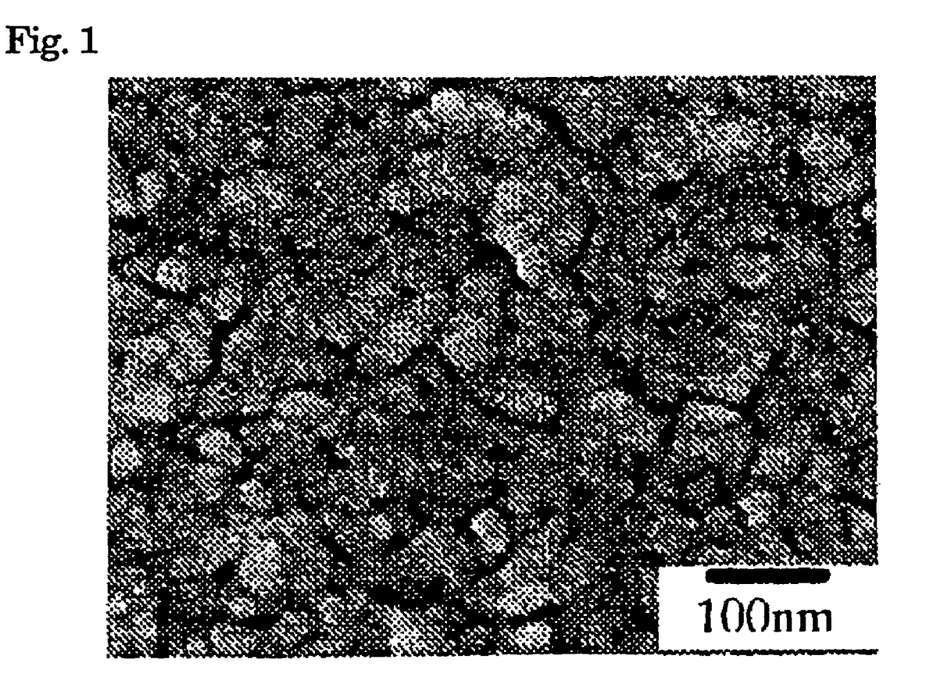
FIG. 1 is the Scanning Electron Microscope (SEM) observation of quinacridone crystal of Example 1 which is obtained by using water as a poor solvent.
Figure 2:
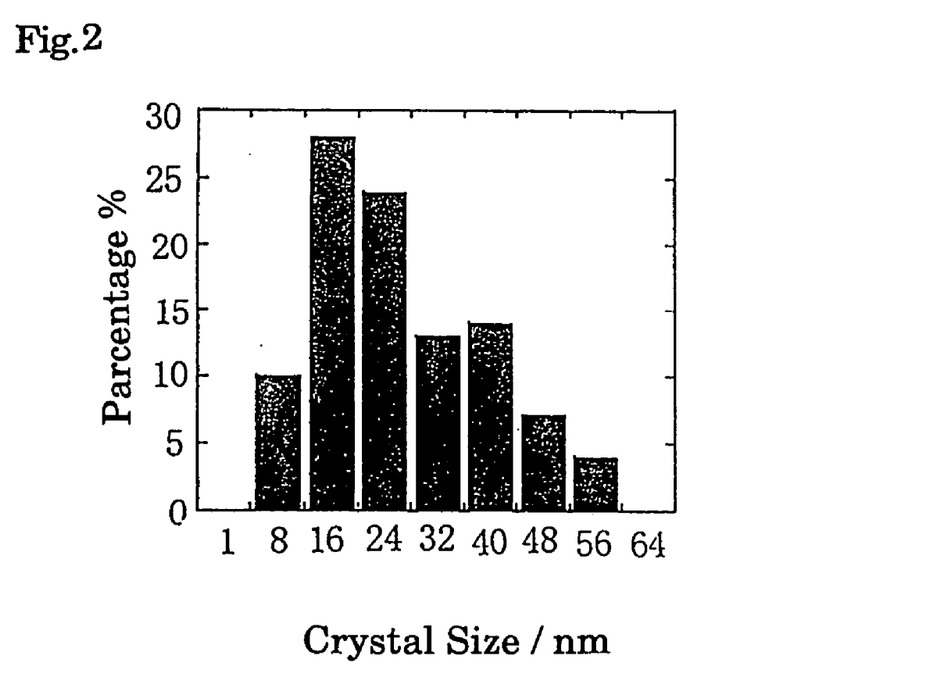
FIG. 2 shows the distribution of average particle size of the quinacridone crystal of Example 1 by observing the size of obtained quinacridone crystal by naked-eye observation of SEM image of Example 1.

1, 3, 5 and 10 mM of non substituted and chained quinacridone pigment are respectively dissolved in 200 μL of 1-methyl-2-pyrrolidinone [common name: N-methylpyrrolidinone (NMP)] at room temperature and obtained uniform solution. Said prepared solutions are poured into 10 mL of water which is vigorously stirred by 1500 rpm. SEM photographs of the obtained fine particles of quinacridone pigment is took, and the image is visually observed and the size of formed particles of quinacridone pigment is measured and distribution of average particle size is determined. SEM image is shown in FIG. 1, distribution of particles size is shown in FIG. 2. Average crystal size of the quinacridone pigment calculated from said measurement is 20 nm.

Figure 3:
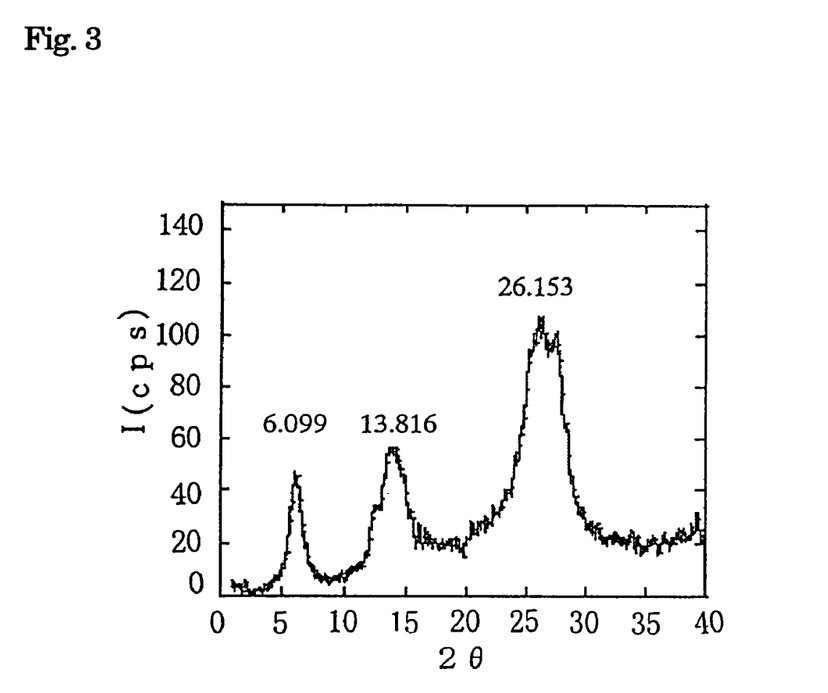
FIG. 3 shows the powder X ray diffraction pattern of nano quinacridone crystal of Example 1. The pattern has 3 peaks at 6.099, 13.816 and 26.153 of 2 θ, and said crystal can be confirmed as γ type.

Powder X ray diffraction pattern of the obtained nano quinacridone crystal is shown in FIG. 3.

Figure 5:
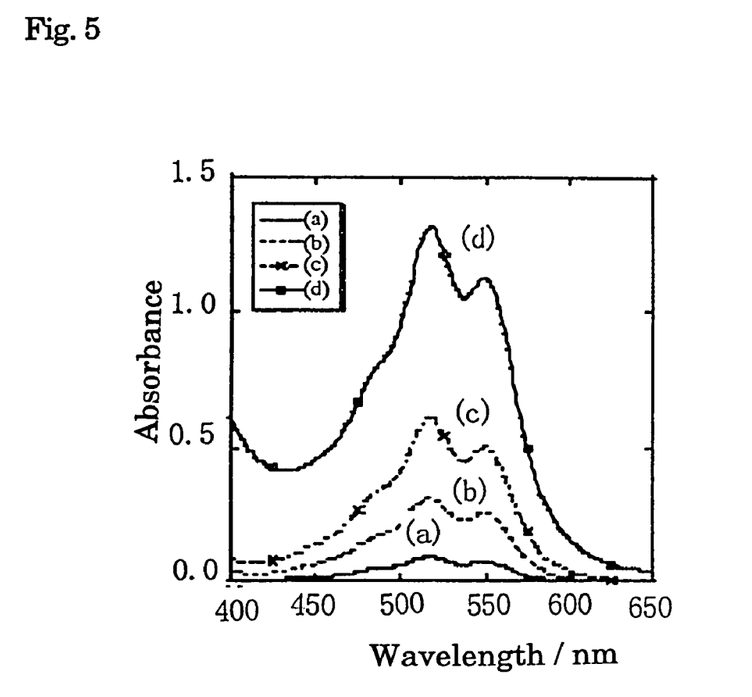
FIG. 5 shows the absorption spectrum of water dispersion liquid of nano quinacridone crystal prepared by changing the solution concentration poured into water, which is poor solvent, to 1 mM (a), 3 mM (b), 5 mM (c) and 10 mM (d).

In FIG. 3, since 2 θ takes three peaks at 6.099, 13.816 and 26.153, this crystal is considered as γ type. Absorption spectrum of water dispersion liquid of nano quinacridone crystal prepared by changing the concentration of the solution poured into water from 1 mM (a), 3 mM (b), 5 mM (c) to 10 mM (d) are shown in FIG. 5.

Figure 6:
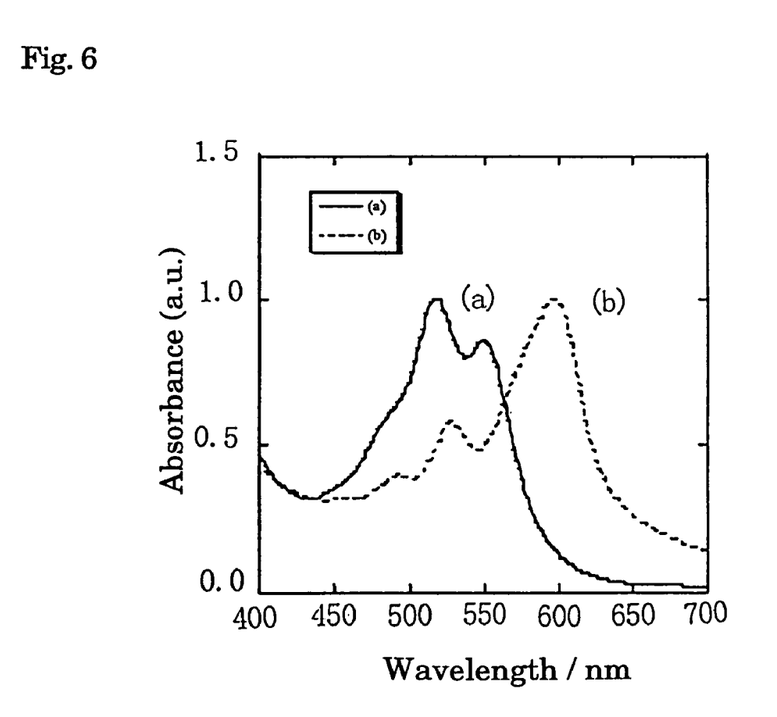
FIG. 6 shows the absorption spectrum of water dispersion liquid of nano quinacridone crystal obtained in Example 1 (a) and (b). (a) has two peaks at 520 and 550 nm, therefore can be confirmed as γ type. Absorption peak position of (b) is beyond 600 nm, therefore can be confirmed as α type.

FIG. 6(a) shows the absorption spectrum of dispersion of quinacridone crystal prepared using water as a poor solvent, and two absorption peaks at 520 nm and 550 nm, and can be confirmed that the crystal is γ type. Further, the absorbance of the dispersion liquid increases in proportion to the concentration of the solution.

Example 2

Quinacridone pigment solution is prepared by same method as Example 1. 200 μL of uniform solution whose concentration of organic pigment is 5 mM is prepared. The prepared solution is poured into 10 mL of methanol vigorously stirred by a stirrer at 1500 rpm stirring speed. The size of the obtained fine particle of quinacridone pigment is measured by same method as Example 1, and average particle size and distribution curve of the obtained fine particle of quinacridone pigment are calculated.

Figure 4:
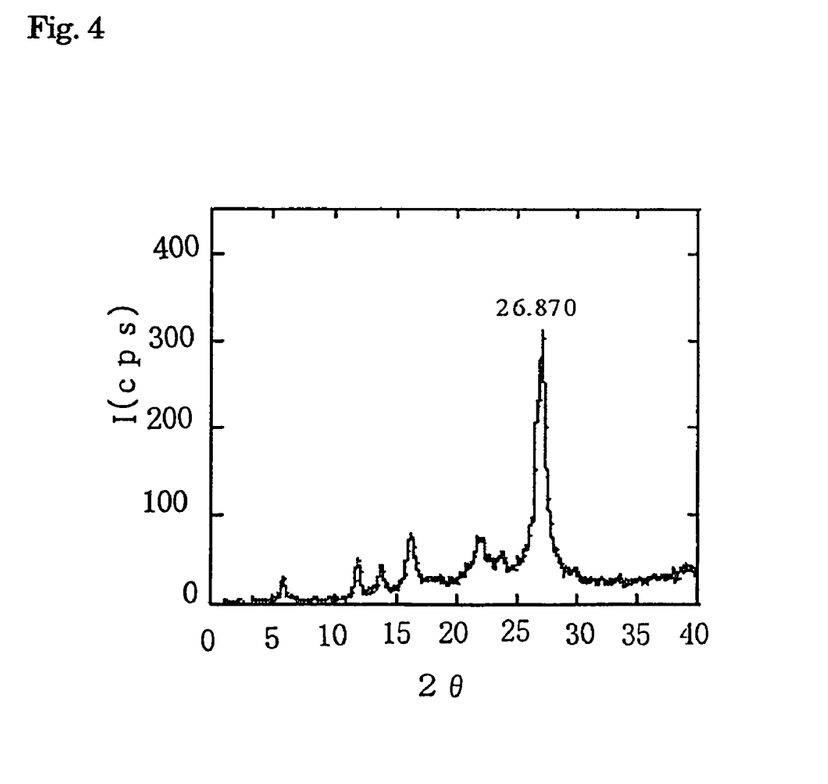
FIG. 4 shows the powder X ray diffraction pattern of nano quinacridone crystal of Example 1 which is obtained by using methanol as a poor solvent. Since the pattern has a peak at 26.870 of 2 θ, said crystal can be considered as α type.

Powder X ray diffraction pattern of the obtained nano quinacridone crystal is shown in FIG. 4. Since the pattern has peaks at 26.870 of 2 θ, said nano crystal of quinacridone can be confirmed as α type. By changing the kind of poor solvent, the kind of crystal form of the obtained quinacridone nano crystal can be controlled.

FIG. 6(b) shows the absorption spectrum of dispersion of quinacridone crystal prepared using methanol as a poor solvent and absorption peak position is beyond 600 nm, therefore can be confirmed as α type. According to the kind of poor solvent, it can be clearly confirmed that the fine particles of quinacridone pigment of different crystal form can be obtained.

Example 3

Figure 7:
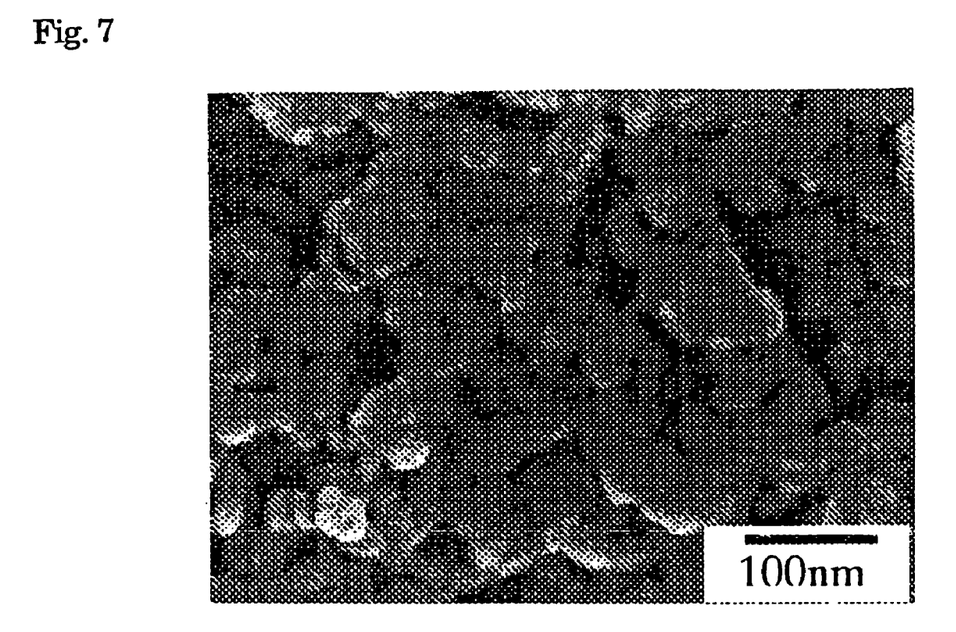
FIG. 7 shows the SEM observation of nano titanyl phthalocyanine crystal obtained in Example 3.
Figure 8:
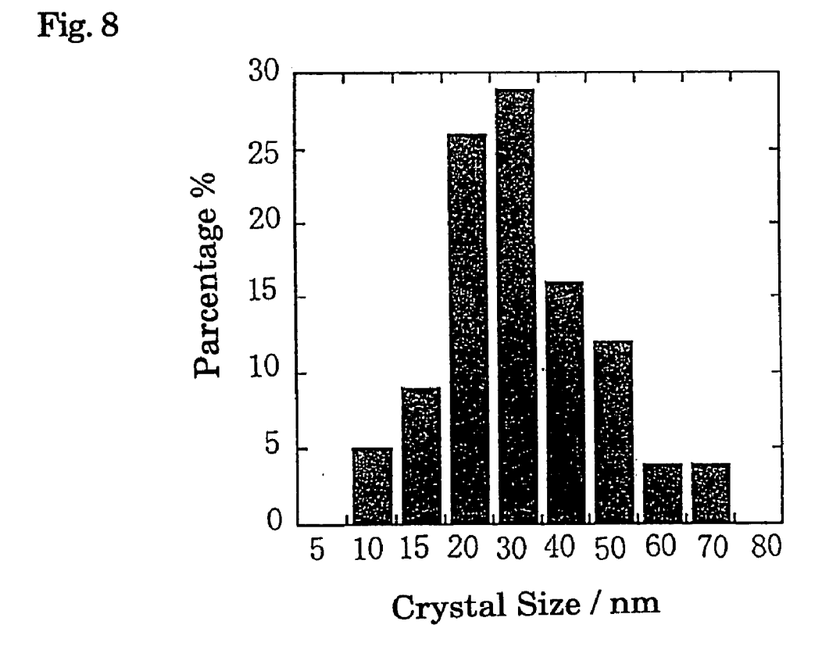
FIG. 8 shows the distribution of average particle size of the nano titanyl phthalocyanine crystal of Example 7 prepared by measuring the size of obtained nano titanyl phthalocyanine crystal from naked-eye observation of SEM image of Example 7.

5 mL of titanyl phthalocyanine pigment solution with 1 mM is prepared according to the method of the mentioned Examples, by exchanging the pigment for titanyl phthalocyanine and using 1:1 mixed solution of NMP-pyridine as a solvent. Said solution is poured into 20 ml of mixed poor solution of water and t-butanol, which is stirred vigorously at the speed of 1500 rpm for one hour at room temperature. SEM image of the obtained nano crystal of titanyl phthalocyanine pigment is prepared by the same as above mentioned Examples. Similarly to Example 1, SEM image of the obtained fine particles is visually observed and the size of formed particles of the obtained nano crystal of titanyl phthalocyanine pigment is measured and distribution of average particle size is evaluated. SEM is shown in FIG. 1, distribution of particle size is shown in FIG. 7 and average size of crystal is 30 nm.

Figure 9:
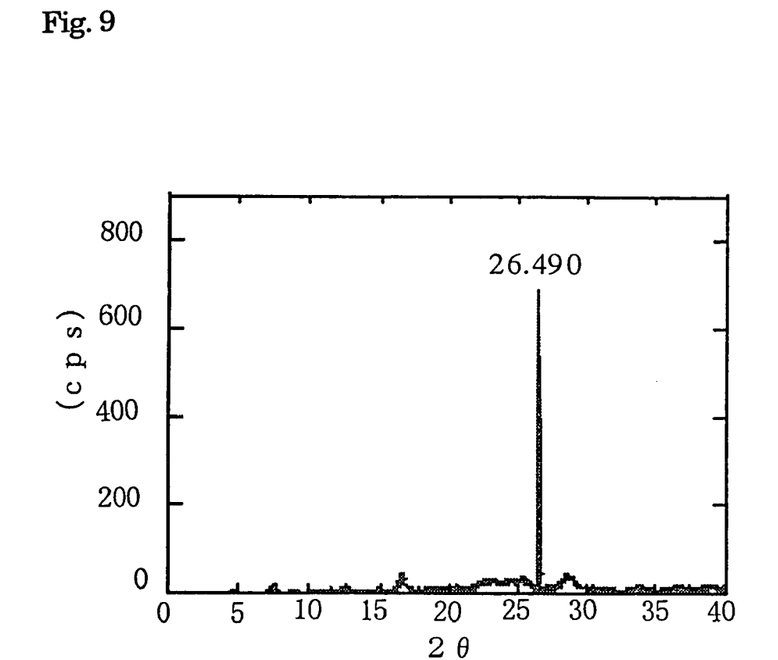
FIG. 9 shows the powder X ray diffraction pattern of nano titanyl phthalocyanine crystal of Example 3. Since the pattern has one strong peak at 26.49 of 2 θ, said crystal can be said a new crystal form which was not found so far.

Powder X ray diffraction pattern of the obtained phthalocyanine nano crystal is shown in FIG. 9. From only one strong peak at 26.49 of 2 θ, said crystal is confirmed as a new crystal form which was not found until now.

Figure 10:
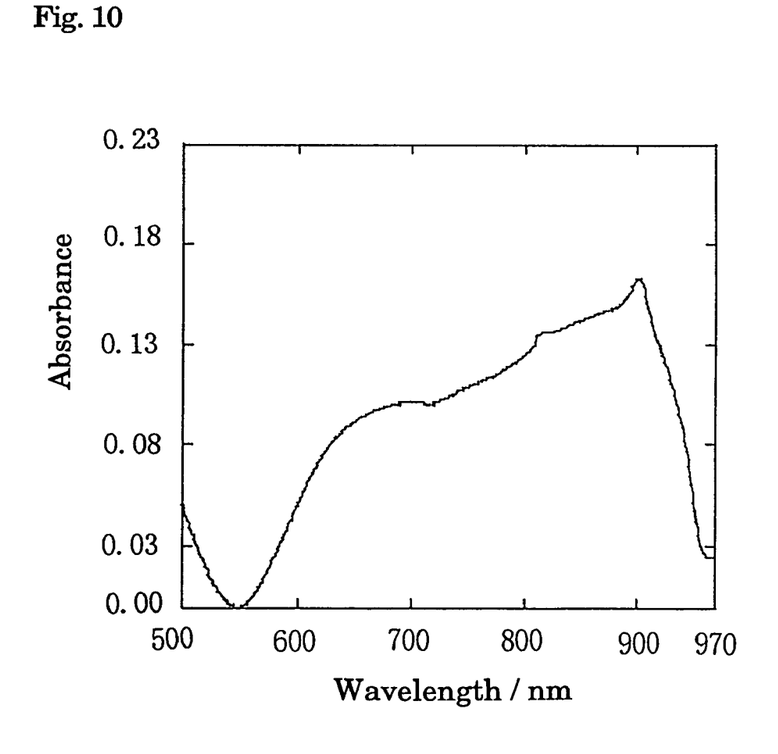
FIG. 10 shows the absorption spectrum of mixed poor solvent dispersion of water and t-butanol of nano titanyl phthalocyanine crystal.

Further, the absorption spectrum of mixed poor solvent dispersion of water-t-butanol of titanyl phthalocyanine nano crystal is shown in FIG. 10. Absorption peak is located at 900 nm, cut off wave length is 960 nm and has absorption band even in the range of longer wavelength region. This absorption characteristic is not found in a conventional phthalocyanine crystal. Concerning these characteristics and the novel characteristics found by powder X ray diffraction, this crystal can be proved as a new crystal. Width of absorption of the crystal obtained in this Example becomes broader than that of Y type, which has the highest performance, having absorption width in the conventional titanyl phthalocyanine crystal. Further, the crystal is very fine size and is useful to be used as a dispersion thin film.

Example 4

2,9-dimethylquinacridone pigment possessing two substituted groups is dissolved in 200 μL of 1,3-dimethyl-2-imidazolidinone at room temperature so as the concentration to be 5 mM and a uniform solution is prepared. The prepared solution is poured into 10 mL of water with vigorously stirring at 1500 rpm using a stirrer.

Size and crystal form of the obtained fine quinacridone pigment particles are measured, and same results as Example 1, that is, 20 nm and γ type are obtained. And the tendency that the absorbance of the dispersion increases in proportion to the concentration of the solution is also same as to Example 1.

INDUSTRIAL APPLICABILITY

As mentioned above, the present invention provides an excellent effect that the high efficient method for preparation of fine particles of organic pigment, especially, fine particles of nanometer size can be provided, by using amide solvent as a solvent for preparation of solution and by combining with a poor solvent which can apply the technique to produce organic fine crystal by a reprecipitation method. Further, it is understood that, according to the selection of a poor solvent, a pigment of different crystal form can be obtained, that is, the remarkable effect that a pigment of desired crystal structure can be obtained by simple change of production condition is provided by the present invention.

The invention claimed is:

1. A method for preparation of concentrated fine nanoparticles of organic pigment comprising, after dissolving organic pigment into an organic solvent consisting of an amide solvent, pouring an obtained pigment solution into a second solution, said second solution being compatible with said organic solvent and being a poor solvent to the pigment, by vigorously stirring.

2. The method for preparation of concentrated fine nanoparticles of organic pigment of claim 1, wherein the organic pigment is azo pigment, phthalocyanine pigment, quinacridone pigment, isoindolinone pigment, cyanine pigment, merocyanine pigment, fullerene pigment, polycyclic aromatic compound or polydiacetylene pigment.

3. The method for preparation of concentrated fine nanoparticles of organic pigment of claim 2, wherein the organic pigment is phthalocyanine pigment or quinacridone pigment.

4. The method for preparation of concentrated fine nanoparticles of organic pigment of claim 3, wherein the amide solvent is selected from the group consisting of 1-methyl-2-pyrrolidinone, 1,3-dimethyl-2-imidazolidinone, 2-pyrrolidinone, ε-caprolactam, formamide, N-methylformamide, N,N-dimethylformamide, acetoamide, N-methylacetoamide, N,N-dimethylacetoamide, N-methylpropaneamide and hexamethylphospholictriamide.

5. The method for preparation of concentrated fine nanoparticles of organic pigment of claim 1, wherein the amide solvent is selected from the group consisting of 1-methyl-2-pyrrolidinon, 1,3-dimethyl-2-imidazolidinone, 2-pyrrolidinone, ε-caprolactam, formamide, N-methylformamide, N,N-dimethylformamide, acetoamide, N-methylacetoamide, N,N-dimethylacetoamide, N-methylpropaneamide and hexamethylphospholictriamide.

6. The method for preparation of concentrated fine nanoparticles of organic pigment of claim 2, wherein the amide solvent is selected from the group consisting of 1-methyl-2-pyrrolidinone, 1,3-dimethyl-2-imidazolidinone, 2-pyrrolidinone, ε-caprolactam, formamide, N-methylformamide, N,N-dimethylformamide, acetoamide, N-methylacetoamide, N,N-dimethylacetoamide, N-methylpropaneamide and hexamethylphospholictriamide.

7. The method for preparation of concentrated fine nanoparticles of organic pigment of claim 1, wherein poor solvent is water, alcohol solvents, ketone solvents, ether solvents, aromatic solvents, carbon disulfide, aliphatic solvents, nitrile solvents, sulfoxide solvents, halide solvents, ester solvents, ionic solution or a mixture of two or more thereof.

8. The method for preparation of concentrated fine nanoparticles of organic pigment of claim 2, wherein poor solvent is water, alcohol solvents, ketone solvents, ether solvents, aromatic solvents, carbon disulfide, aliphatic solvents, nitrile solvents, sulfoxide solvents, halide solvents, ester solvents, ionic solution or a mixture of two or more thereof.

9. The method for preparation of concentrated fine nanoparticles of organic pigment of claim 3, wherein poor solvent is water, alcohol solvents, ketone solvents, ether solvents, aromatic solvents, carbon disulfide, aliphatic solvents, nitrile solvents, sulfoxide solvents, halide solvents, ester solvents, ionic solution or a mixture of two or more thereof.

10. The method for preparation of concentrated fine nanoparticles of organic pigment of claim 4, wherein poor solvent is water, alcohol solvents, ketone solvents, ether solvents, aromatic solvents, carbon disulfide, aliphatic solvents, nitrile solvents, sulfoxide solvents, halide solvents, ester solvents, ionic solution or a mixture of two or more thereof.

11. The method for preparation of concentrated fine nanoparticles of organic pigment of claim 2, wherein said organic solvent is selected from the group consisting of 1-methyl-2-pyrrolidinone, 2-pyrrolidinone, 1,3-dimethyl-2-imidazolidinone and a mixed amide organic solvent containing 1-methyl-2-pyrrolidinone, 2-pyrrolidinone or 1,3-dimethyl-2-imidazolidinone in an amount that is more than 50 volume % of the organic solvent, and said poor solvent is water and/or alcoholic solvent.

12. The method for preparation of concentrated fine nanoparticles of claim 3, wherein said organic solvent is selected from the group consisting of 1-methyl-2-pyrrolidinone, 2-pyrrolidinoe, 1,3-dimethyl-2-imidazolidinone and a mixed amide organic solvent containing 1-methyl-2-pyrrolidinone, 2-pyrrolidinone or 1,3-dimethyl-2-imidazolidinone in an amount that is more than 50 volume % of the organic solvent, and said poor solvent is water and/or alcoholic solvent.

13. The method for preparation of concentrated fine nanoparticles of claim 1 comprising, carrying out preparation of said organic solvent by dissolving an organic pigment by a condition from heating at around maximum boiling point under atmospheric pressure to heating under supercritical state, then pouring an obtained concentrated organic solvent of 0.5 mmol/L to 100 mmol/L into a poor solvent of a lowest temperature of a liquid state.

14. The method for preparation of concentrated fine nanoparticles of claim 2 comprising, carrying out preparation of said organic solvent by dissolving an organic pigment by a condition from heating at around maximum boiling point under atmospheric pressure to heating under supercritical state, then pouring an obtained concentrated organic solvent of 0.5 mmol/L to 100 mmol/L into a poor solvent of a lowest temperature of a liquid state.

15. The method for preparation of concentrated fine nanoparticles of claim 3 comprising, carrying out preparation of said organic solvent by dissolving an organic pigment by a condition from heating at around maximum boiling point under atmospheric pressure to heating under supercritical state, then pouring an obtained concentrated organic solvent of 0.5 mmol/L to 100 mmol/L into a poor solvent of a lowest temperature of a liquid state.

16. The method for preparation of concentrated fine nanoparticles of claim 4 comprising, carrying out preparation of said organic solvent by dissolving an organic pigment by a condition from heating at around maximum boiling point under atmospheric pressure to heating under supercritical state, then pouring an obtained concentrated organic solvent of 0.5 mmol/L to 100 mmol/L into a poor solvent of a lowest temperature of a liquid state.

17. The method for preparation of concentrated fine nanoparticles of claim 5 comprising, carrying out preparation of said organic solvent by dissolving an organic pigment by a condition from heating at around maximum boiling point under atmospheric pressure to heating under supercritical state, then pouring an obtained concentrated organic solvent of 0.5 mmol/L to 100 mmol/L into a poor solvent of a lowest temperature of a liquid state.

* * * * *

UNITED STATES PATENT AND TRADEMARK OFFICE
CERTIFICATE OF CORRECTION

PATENT NO.        : 7,192,477 B2
APPLICATION NO. : 10/525228
DATED             : March 20, 2007
INVENTOR(S)       : Nakanishi et al.

It is certified that error appears in the above-identified patent and that said Letters Patent is hereby corrected as shown below:

On the Title Page, Item (75), replace "Koich" with --Koichi--;
replace in line 7, "Shuji Oikawa" with --Shuji Okada--.

Signed and Sealed this

Eighteenth Day of March, 2008

JON W. DUDAS
*Director of the United States Patent and Trademark Office*